United States Patent
Natsui et al.

(10) Patent No.: US 11,605,814 B2
(45) Date of Patent: *Mar. 14, 2023

(54) POSITIVE-ELECTRODE ACTIVE MATERIAL CONTAINING LITHIUM COMPOSITE OXIDE, AND BATTERY INCLUDING THE SAME

(71) Applicant: Panasonic Intellectual Property Management Co., Ltd., Osaka (JP)

(72) Inventors: Ryuichi Natsui, Osaka (JP); Kensuke Nakura, Osaka (JP); Junko Matsushita, Osaka (JP); Issei Ikeuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 217 days.

This patent is subject to a terminal disclaimer.

(21) Appl. No.: 16/683,275

(22) Filed: Nov. 14, 2019

(65) Prior Publication Data
US 2020/0083529 A1   Mar. 12, 2020

Related U.S. Application Data

(63) Continuation of application No. PCT/JP2017/041747, filed on Nov. 21, 2017.

(30) Foreign Application Priority Data

May 29, 2017  (JP) .............................. JP2017-105304

(51) Int. Cl.
*H01M 4/505* (2010.01)
*H01M 4/525* (2010.01)
(Continued)

(52) U.S. Cl.
CPC .......... *H01M 4/505* (2013.01); *H01M 4/525* (2013.01); *H01M 10/052* (2013.01);
(Continued)

(58) Field of Classification Search
None
See application file for complete search history.

(56) References Cited

U.S. PATENT DOCUMENTS

| 5,308,720 A | 5/1994 | Kurokawa et al. |
| 6,040,090 A | 3/2000 | Sunagawa et al. |

(Continued)

FOREIGN PATENT DOCUMENTS

| CN | 102246334 A | 11/2011 |
| CN | 102368547 A | 3/2012 |

(Continued)

OTHER PUBLICATIONS

Extended European Search Report dated Dec. 6, 2019 for the related European Patent Application No. 17900203.5.

(Continued)

*Primary Examiner* — Laura Weiner
(74) *Attorney, Agent, or Firm* — McDermott Will & Emery LLP

(57) ABSTRACT

A positive-electrode active material contains a lithium composite oxide containing manganese. The crystal structure of the lithium composite oxide belongs to a space group Fd-3m. The integrated intensity ratio $I_{(111)}/I_{(400)}$ of a first peak $I_{(111)}$ on the (111) plane to a second peak $I_{(400)}$ on the (400) plane in an XRD pattern of the lithium composite oxide satisfies $0.05 \leq I_{(111)}/I_{(400)} \leq 0.90$.

20 Claims, 1 Drawing Sheet

(51) Int. Cl.
  *H01M 10/0562* (2010.01)
  *H01M 10/0565* (2010.01)
  *H01M 10/052* (2010.01)
  *H01M 4/02* (2006.01)
  *C01D 15/02* (2006.01)
  *H01M 10/0566* (2010.01)

(52) U.S. Cl.
  CPC ... *H01M 10/0562* (2013.01); *H01M 10/0565* (2013.01); *C01D 15/02* (2013.01); *C01P 2002/74* (2013.01); *C01P 2002/76* (2013.01); *H01M 10/0566* (2013.01); *H01M 2004/027* (2013.01); *H01M 2004/028* (2013.01)

(56) References Cited

U.S. PATENT DOCUMENTS

| | | | |
|---|---|---|---|
| 6,627,351 | B1 | 9/2003 | Yamaura |
| 7,695,869 | B2 | 4/2010 | Park et al. |
| 9,570,734 | B2 | 2/2017 | Kelder et al. |
| 10,651,462 | B2 | 5/2020 | Ishikawa et al. |
| 10,818,910 | B2 | 10/2020 | Natsui et al. |
| 10,886,529 | B2* | 1/2021 | Ishikawa ............ H01M 4/525 |
| 11,201,319 | B2* | 12/2021 | Ishikawa ............ H01M 4/505 |
| 11,233,237 | B2* | 1/2022 | Omae ............ H01M 4/505 |
| 2005/0170250 | A1 | 8/2005 | Ohzuku et al. |
| 2009/0023067 | A1 | 1/2009 | Park et al. |
| 2009/0087746 | A1 | 4/2009 | Kang et al. |
| 2010/0233542 | A1 | 9/2010 | Endo et al. |
| 2011/0076556 | A1* | 3/2011 | Karthikeyan ........ H01M 4/525 429/188 |
| 2011/0099798 | A1 | 5/2011 | Nilsen et al. |
| 2011/0294006 | A1 | 12/2011 | Amine et al. |
| 2011/0311882 | A1 | 12/2011 | Kim et al. |
| 2013/0168599 | A1 | 7/2013 | Kato et al. |
| 2013/0209871 | A1 | 8/2013 | Kato et al. |
| 2013/0216701 | A1 | 8/2013 | Lopez et al. |
| 2014/0099549 | A1 | 4/2014 | Ceder et al. |
| 2014/0114519 | A1 | 4/2014 | Iwama et al. |
| 2014/0162127 | A1 | 6/2014 | Kim et al. |
| 2014/0170492 | A1 | 6/2014 | Xia et al. |
| 2015/0380737 | A1 | 12/2015 | Kawasato et al. |
| 2016/0028080 | A1 | 1/2016 | Sugiura |
| 2016/0099469 | A1 | 4/2016 | Paulsen et al. |
| 2016/0351901 | A1 | 12/2016 | Saito |
| 2016/0351973 | A1 | 12/2016 | Albano et al. |
| 2016/0380263 | A1 | 12/2016 | Nakayama et al. |
| 2017/0069907 | A1 | 3/2017 | Zhu et al. |
| 2017/0125808 | A1 | 5/2017 | Blangero et al. |
| 2017/0155133 | A1 | 6/2017 | Lee et al. |
| 2018/0069267 | A1 | 3/2018 | Suzuki et al. |
| 2018/0076452 | A1 | 3/2018 | Sasaki et al. |
| 2018/0076484 | A1 | 3/2018 | Nakatsutsumi et al. |
| 2018/0083313 | A1 | 3/2018 | Nakatsutsumi et al. |
| 2018/0090747 | A1 | 3/2018 | Natsui et al. |
| 2018/0090760 | A1 | 3/2018 | Natsui et al. |
| 2018/0145368 | A1 | 5/2018 | Ochiai et al. |
| 2018/0205073 | A1 | 7/2018 | Natsui et al. |
| 2019/0036106 | A1 | 1/2019 | Ishikawa et al. |
| 2019/0036113 | A1 | 1/2019 | Ishikawa et al. |
| 2019/0221837 | A1 | 7/2019 | Ishikawa et al. |
| 2019/0221838 | A1 | 7/2019 | Ishikawa et al. |
| 2020/0006749 | A1 | 1/2020 | Ikeuchi et al. |
| 2020/0020943 | A1 | 1/2020 | Natsui et al. |
| 2020/0044249 | A1 | 2/2020 | Natsui et al. |
| 2021/0083274 | A1 | 3/2021 | Ishikawa et al. |
| 2021/0143419 | A1 | 5/2021 | Ikenuma |

FOREIGN PATENT DOCUMENTS

| | | |
|---|---|---|
| CN | 103094523 A | 5/2013 |
| CN | 103779542 A | 5/2014 |
| EP | 1531506 A1 | 5/2005 |
| EP | 2555287 A1 | 2/2013 |
| EP | 2741353 A1 | 6/2014 |
| EP | 3118916 A1 | 1/2017 |
| JP | 2000-149942 | 5/2000 |
| JP | 2000-182616 | 6/2000 |
| JP | 2000-195514 A | 7/2000 |
| JP | 2000-203843 A | 7/2000 |
| JP | 2000-243394 A | 9/2000 |
| JP | 2000-348722 A | 12/2000 |
| JP | 2005-053764 A | 3/2005 |
| JP | 2006-190556 | 7/2006 |
| JP | 2007-257885 A | 10/2007 |
| JP | 2008-127211 A | 6/2008 |
| JP | 2008-156163 | 7/2008 |
| JP | 2008-156163 A | 7/2008 |
| JP | 2009-110952 | 5/2009 |
| JP | 2010-092706 | 4/2010 |
| JP | 2010-135187 A | 6/2010 |
| JP | 2012-003879 A | 1/2012 |
| JP | 2012-038562 A | 2/2012 |
| JP | 2012-038564 A | 2/2012 |
| JP | 2012-041257 A | 3/2012 |
| JP | 2013-065472 A | 4/2013 |
| JP | 2014-130782 A | 7/2014 |
| JP | 2015-040157 A | 3/2015 |
| JP | 2015-135800 A | 7/2015 |
| JP | 2015-535801 A | 12/2015 |
| JP | 2016-025010 A | 2/2016 |
| JP | 2016-026981 A | 2/2016 |
| JP | 2016-102043 A | 6/2016 |
| JP | 2016-103456 A | 6/2016 |
| JP | 2016-110717 A | 6/2016 |
| WO | 2008/023622 A | 2/2008 |
| WO | 2010/068524 A2 | 6/2010 |
| WO | 2012/102354 A1 | 8/2012 |
| WO | 2013/061922 | 5/2013 |
| WO | 2015/115025 A1 | 8/2015 |
| WO | 2017/013848 A1 | 1/2017 |
| WO | 2017/119411 A1 | 7/2017 |
| WO | 2017/143329 A1 | 8/2017 |
| WO | 2018/163519 A1 | 9/2018 |

OTHER PUBLICATIONS

Extended European Search Report dated Dec. 6, 2019 for the related European Patent Application No. 17900042.7.

Extended European Search Report dated Dec. 17, 2019 for the related European Patent Application No. 17907463.8.

Ho-Suk Shin et al., "Synthesis and electrochemical properties of Li [Ni0.4Co0.2Mn(0.4-x)Mgx]O2-yFy via a carbonate co-precipitation," Current Applied Physics, North-Holland, Amsterdam, NL, vol. 6, Mar. 13, 2006, XP029175470.

Ji Won Min et al., "Simple, robust metal fluoride coating on layered Li1.23Ni0.13Co0.14Mn0.56O2 and its effects an enhanced electrochemical properties," Electrochimica Acta, vol. 100, Jun. 1, 2013, pp. 10-17, XP055095380.

Kyung-Wan Nam et al., "Structural changes and thermal stability of charged Li Ni 1/3Co" 1/3Mn1/3 O2 cathode material for Li-ion batteries studied by time-resolved Xrd," Journal of Power Sources, Elsevier SA, CH, vol. 189, No. 1, Apr. 1, 2009, pp. 515-518, XP025982738.

Kyung-Keun Lee et al., "Thermal behavior and the decomposition mechanism of electrochemically delithiated LiNiO," Journal of Power Sources, Elsevier SA,CH, vol. 97-98, Dec. 4, 2000, pp. 321-325, XP028142802.

Jordi Cabana et al., "Structural and Electrochemical Characterization of Composite Layered-Spinel Electrodes Containing Ni and Mn for Li-Ion Batteries," Journal of the Electrochemical Society, vol. 156, No. 9, Jan. 1, 2009, pages A730-A736, XP055068477.

Prasant Kumar Nayak et al., "Electrochemical Performance of a Layered-Spinel Integrated Li [Ni 1/3 Mn 2/3] O2 as a High Capacity Cathode Material for Li-Ion Batteries," Chemistry of Materials, vol. 27, No. 7, Mar. 24, 2015, pp. 2600-2611, XP055639392.

Jianming Zheng et al., "Improved electrochemical performance of Li [Li0.2Mn0.54Ni0.13Co0.13]O2 cathode material by fluorine incorporation," Electrochimica Acta, vol. 105, Aug. 1, 2013, pp. 200-208, XP55095378.

(56) References Cited

OTHER PUBLICATIONS

International Search Report of PCT application No. PCT/JP2017/041747 dated Feb. 13, 2018.
Non-Final Office Action issued in U.S. Appl. No. 16/558,335, dated Nov. 25, 2020.
Non-Final Office Action issued in U.S. Appl. No. 16/558,335, dated May 27, 2021.
Non-Final Office Action issued in U.S. Appl. No. 16/558,332, dated Jun. 16, 2021.
International Search Report of PCT application No. PCT/JP2017/041592 dated Feb. 13, 2018.
International Search Report of PCT application No. PCT/JP2017/041590 dated Feb. 6, 2018.
International Search Report of PCT application No. PCT/JP2017/041746 dated Feb. 13, 2018.
Extended European Search Report dated Apr. 28, 2020 for the related European Patent Application No. 17912072.0.
Belharouak I. et al., "Safety characteristics of Li(Ni"0"."8Co"0"."1"5Al"0"."0"5)O"2 and Li(Ni"1"/"3Co"1"/"3Mn"1 "/"3)O"2," Electrochemistry Communications, Elsevier, Amsterdam, NL, vol. 8, No. 2, Feb. 2006, pp. 329-335, XP028041436.
Julien C. et al: "Combustion synthesis and characterization of substituted lithium cobalt oxides in lithium batteries," Solid State Ionics, North Holland Pub. Company, Amsterdam, NL, vol. 135, No. 1-4, Nov. 2000, pp. 241-248, XP004221554.
Persson, Kristin, Materials Data on Li2MnO3 (SG:12) by Materials Project. United States: N. p., 2014. Web. doi:10.17188/1193768, 2, Nov. 2014.
Denis Y.W. Yu et al., "Electrochemical Activities in Li2MnO3", Journal of The Electrochemical Society, 2009 ,vol. 156, issue 6, A417-A424, Apr. 3, 2009.
Final Office Action issued in U.S. Appl. No. 16/558,332, dated Sep. 22, 2021.
Notice of Allowance issued in U.S. Appl. No. 16/558,335, dated Sep. 8, 2021.
Non-Final Office Action issued in U.S. Appl. No. 16/214,208, dated Apr. 27, 2020.
Notice of Allowance issued in U.S. Appl. No. 16/214,208, dated Sep. 8, 2020.
Non-Final Office Action issued in U.S. Appl. No. 17/108,810, dated Nov. 5, 2021.
Indian Examination Report dated Feb. 11, 2022 for the related Indian Patent Application No. 201947042035.
English Translation of Chinese Search Report dated Jan. 28, 2022 for the related Chinese Patent Application No. 201780084633.7.
English Translation of Chinese Search Report dated Apr. 20, 2022 for the related Chinese Patent Application No. 201780034292.3.
The Extended European Search Report dated Oct. 14, 2020 for the related European Patent Application No. 18863407.5.
International Search Report of PCT Application No. PCT/JP2018/026115 dated Oct. 16, 2018.
English language translation of form PCT/ISA/237 for the related PCT Application No. PCT/JP2018/026115 dated Oct. 16, 2018.
Non-Final Office Action issued in U.S. Appl. No. 16/683,275 dated Nov. 3, 2021.
Final Office Action issued in U.S. Appl. No. 16/034,424 dated Feb. 4, 2021.
Non-Final Office Action issued in U.S. Appl. No. 16/034,424 dated Oct. 21, 2020.
Notice of Allowance issued in U.S. Appl. No. 16/034,424 dated Aug. 19, 2021.
Notice of Allowance issued in U.S. Appl. No. 16/687,703 dated Oct. 18, 2021.
English Transiation of Chinese Search Report dated Jul. 22, 2022 for the related Chinese Patent Application No. 201780084624.8.
English Translation of Chinese Search Report dated Aug. 29, 2022 for the related Chinese Patent Application No. 201780084633.7.
English Translation of Chinese Search Report dated Oct. 17, 2022 for the related Chinese Patent Application No. 201780034292.3.

* cited by examiner

POSITIVE-ELECTRODE ACTIVE MATERIAL CONTAINING LITHIUM COMPOSITE OXIDE, AND BATTERY INCLUDING THE SAME

RELATED APPLICATIONS

This application is a Continuation of PCT Application No. PCT/JP2017/041747 filed Nov. 21, 2017, which claims priority to Japanese Patent Application No. 2017-105304 filed May 29, 2017, the entire contents of each of which are incorporated herein by reference.

BACKGROUND

1. Technical Field

The present disclosure relates to a positive-electrode active material for use in batteries and to a battery.

2. Description of the Related Art

Japanese Unexamined Patent Application Publication No. 2008-156163 discloses a spinel-type lithium manganese oxide that has a chemical composition represented by the general formula $Li_{1+x}M_yMn_{2-x-y}O_4$, has a maximum particle size $D_{100}$ of 15 μm or less, has a half-width of 0.30 or less on the (400) plane in X-ray diffraction, and has a ratio $I_{400}/I_{111}$ of 0.33 or more, wherein I400 denotes the peak intensity of the (400) plane and $I_{111}$ denotes the peak intensity of the (111) plane. M denotes one or two or more metal elements selected from Al, Co, Ni, Mg, Zr, and Ti, x is in the range of 0≤x≤0.33, and y is in the range of 0≤y≤0.2.

SUMMARY

In one general aspect, the techniques disclosed here feature a positive-electrode active material containing a lithium composite oxide containing manganese, wherein a crystal structure of the lithium composite oxide belongs to a space group Fd-3m, and the integrated intensity ratio $I_{(111)}/I_{(400)}$ of a first peak $I_{(111)}$ on the (111) plane to a second peak $I_{(400)}$ on the (400) plane in an X-ray diffraction (XRD) pattern of the lithium composite oxide satisfies $0.05 \leq I_{(111)}/I_{(400)} \leq 0.90$.

It should be noted that general or specific aspects of the present disclosure may be implemented as a positive-electrode active material for batteries, a battery, a method, or any combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
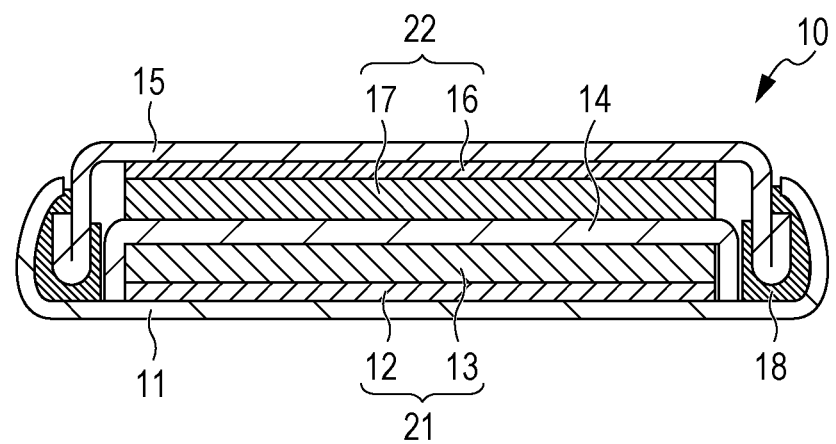
FIG. 1 is a schematic cross-sectional view of a battery, which is an example of a battery according to a second embodiment.

Embodiments of the present disclosure will be described below.

First Embodiment

A positive-electrode active material according to a first embodiment is a positive-electrode active material containing a lithium composite oxide, wherein the lithium composite oxide has a crystal structure belonging to a space group Fd-3m, and the integrated intensity ratio $I_{(111)}/I_{(400)}$ of a peak on the (111) plane to a peak on the (400) plane in an XRD pattern of the positive-electrode active material satisfies $0.05 \leq I_{(111)}/I_{(400)} \leq 0.90$.

Such an embodiment can provide a high-capacity battery.

For example, when the positive-electrode active material according to the first embodiment is used to fabricate a lithium-ion battery, the lithium-ion battery has an oxidation-reduction potential of approximately 3.4 V (versus Li/Li$^+$). The lithium-ion battery has a capacity of approximately 260 mAh/g or more.

The lithium composite oxide according to the first embodiment has a crystal structure belonging to the space group Fd-3m, and the integrated intensity ratio $I_{(111)}/I_{(400)}$ of a peak on the (111) plane to a peak on the (400) plane in an X-ray diffraction (XRD) pattern of the lithium composite oxide satisfies $0.05 \leq I_{(111)}/I_{(400)} \leq 0.90$.

$I_{(111)}/I_{(400)}$ is a parameter that can be an indicator of cation mixing in a lithium composite oxide with a crystal structure belonging to the space group Fd-3m. The term "cation mixing", as used herein, refers to the substitution of a cation between lithium atoms and cation atoms of a transition metal or the like in a crystal structure of a lithium composite oxide. A decrease in cation mixing results in an increase in $I_{(111)}/I_{(400)}$. On the other hand, an increase in cation mixing results in a decrease in $I_{(111)}/I_{(400)}$.

The lithium composite oxide according to the first embodiment, which has a crystal structure belonging to the space group Fd-3m and satisfies $0.05 \leq I_{(111)}/I_{(400)} \leq 0.90$, includes a relatively large amount of cation mixing. Thus, cation mixing between lithium atoms and cation atoms of a transition metal or the like occurs at all the "8a site, 16d site, and 16c site" corresponding to the "cation sites" (that is, a "Li layer" and a "transition metal layer"). As long as $0.05 \leq I_{(111)}/I_{(400)} \leq 0.90$ is satisfied, the Li occupancy at each site is not particularly limited.

The cation mixing improves the diffusibility of Li in the "transition metal layer" in addition to high diffusibility of Li in the "Li layer". The cation mixing also improves the diffusibility of Li between the "Li layer" and the "transition metal layer". Thus, Li can diffuse efficiently at all the "cation sites". Thus, the lithium composite oxide according to the first embodiment is more suitable for high-capacity batteries than known regularly ordered (that is, low cation mixing) lithium composite oxides.

In the lithium composite oxide according to the first embodiment, $I_{(111)}/I_{(400)}$ of less than 0.05 results in excessively high Li occupancy in the "transition metal layer", thus resulting in a thermodynamically unstable crystal structure. Thus, deintercalation of Li during charging causes the crystal structure to collapse and results in insufficient capacity.

In the lithium composite oxide according to the first embodiment, $I_{(111)}/I_{(400)}$ of more than 0.90 results in reduced cation mixing, low Li occupancy in the "transition metal layer", and a decrease in three-dimensional diffusion paths of Li. This reduces the diffusibility of Li and results in insufficient capacity.

Thus, the lithium composite oxide according to the first embodiment, which satisfies $0.05 \leq I_{(111)}/I_{(400)} \leq 0.90$, includes sufficient cation mixing between lithium atoms and cation atoms of a transition metal or the like. Thus, in the lithium composite oxide according to the first embodiment, an increased number of three-dimensional diffusion paths of lithium allows more Li to be intercalated and deintercalated.

The lithium composite oxide according to the first embodiment, which has a crystal structure belonging to the space group Fd-3m and satisfies $0.05 \leq I_{(111)}/I_{(400)} \leq 0.90$, can stably maintain the crystal structure even when much Li is deintercalated, because a transition metal anion octahedron serving as a pillar three-dimensionally forms a network. Thus, the positive-electrode active material according to the first embodiment allows more Li to be intercalated and deintercalated. Thus, the positive-electrode active material according to the first embodiment is suitable for high-capacity batteries. For the same reasons, the positive-electrode active material according to the first embodiment is also suitable for batteries with good cycle characteristics.

For example, a crystal structure belonging to the space group Fd-3m can easily maintain its layered structure and rarely collapses when much Li is deintercalated, as compared with a layered structure belonging to the space group R-3m.

Japanese Unexamined Patent Application Publication No. 2008-156163 is described below as a comparative example. This patent literature discloses a positive-electrode material containing a lithium composite oxide that has a crystal structure belonging to the space group Fd-3m and that includes insufficient cation mixing between lithium atoms and cation atoms of a transition metal or the like. The lithium composite oxide approximately satisfies $2 \leq I_{(111)}/I_{(400)} \leq 3$. It is mentioned that this significantly reduces irregularities in the crystal structure and results in good battery characteristics.

Thus, the related art has not studied or suggested a lithium composite oxide that satisfies $0.05 \leq I_{(111)}/I_{(400)} \leq 0.90$ as described in the first embodiment of the present disclosure.

The positive-electrode active material according to the first embodiment is a positive-electrode active material containing a lithium composite oxide, and the lithium composite oxide has a crystal structure belonging to the space group Fd-3m and satisfies $0.05 \leq I_{(111)}/I_{(400)} \leq 0.90$. Under these conditions, the present inventors have developed a battery with higher capacity than expected.

The lithium composite oxide according to the first embodiment may satisfy $0.05 \leq I_{(111)}/I_{(400)} \leq 0.70$.

Such an embodiment can provide a higher-capacity battery.

The lithium composite oxide according to the first embodiment may satisfy $0.05 \leq I_{(111)}/I_{(400)} \leq 0.30$.

Such an embodiment can provide a higher-capacity battery.

Typically, a peak on the (111) plane and a peak on the (400) plane in an XRD pattern obtained with CuKα radiation are located at a diffraction angle 2θ in the range of 18 degrees to 20 degrees and 44 degrees to 46 degrees, respectively.

The integrated intensity of each diffraction peak can be determined, for example, using software associated with an XRD apparatus (for example, PDXL associated with an X-ray powder diffractometer manufactured by Rigaku Corporation). In this case, the integrated intensity of each diffraction peak can be determined, for example, by calculating the area at the diffraction peak top angle ±3 degrees.

In the lithium composite oxide according to the first embodiment, the element occupying the "transition metal layer" may be a cation atom of a transition metal or the like. For example, the cation atom of the transition metal or the like may be one or two or more elements selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al.

Such an embodiment can provide a higher-capacity battery.

In the lithium composite oxide according to the first embodiment, the element occupying the "transition metal layer" may be one or two or more elements selected from the group consisting of Mn, Co, Ni, Fe, Cu, V, Nb, Ti, Cr, Ru, W, B, Si, P, and Al, for example.

Such an embodiment can provide a higher-capacity battery.

In the lithium composite oxide according to the first embodiment, the element occupying the "transition metal layer" may contain at least one selected from the group consisting of Mn, Co, Ni, Fe, Cu, V, Ti, Cr, and Zn, that is, at least one 3d transition metal element, for example.

Such an embodiment can provide a higher-capacity battery.

The lithium composite oxide according to the first embodiment may contain Mn.

Such an embodiment including Mn, which can easily form a hybrid orbital with oxygen, reduces oxygen desorption during charging. Even with relatively high cation mixing (for example, $0.05 \leq I_{(111)}/I_{(400)} \leq 0.90$ is satisfied), the crystal structure is stabilized. This allows more Li to be intercalated and deintercalated. Thus, the battery can have a higher capacity.

The lithium composite oxide according to the first embodiment may contain one or two or more elements selected from the group consisting of F, Cl, N, and S.

Such an embodiment partly substitutes an electrochemically inactive anion for oxygen and thereby stabilizes the crystal structure. The substitution of an anion with a large ionic radius for part of oxygen widens the crystal lattice and improves the diffusibility of Li. Even with relatively high cation mixing (for example, $0.05 \leq I_{(111)}/I_{(400)} \leq 0.90$ is satisfied), the crystal structure is stabilized. This allows more Li to be intercalated and deintercalated. Thus, the battery can have a higher capacity.

The lithium composite oxide according to the first embodiment may contain F.

Such an embodiment partly substitutes electronegative F for oxygen and thereby promotes cation-anion interaction and improves the discharge capacity or operating voltage of the battery. Solid solution of electronegative F causes greater electron localization than a lithium composite oxide containing no F. This can reduce oxygen desorption during charging and thereby stabilizes the crystal structure. Even with relatively high cation mixing (for example, $0.05 \leq I_{(111)}/I_{(400)} \leq 0.90$ is satisfied), the crystal structure is stabilized. This allows more Li to be intercalated and deintercalated. These effects can work together to provide a higher-capacity battery.

An example of the chemical composition of the lithium composite oxide according to the first embodiment is described below.

The lithium composite oxide according to the first embodiment may be a compound represented by the following composition formula (1).

$$Li_xMe_yO_\alpha Q_\beta \quad \text{formula (1)}$$

Me may be one or two or more elements selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al.

Me may include at least one selected from the group consisting of Mn, Co, Ni, Fe, Cu, V, Ti, Cr, and Zn, that is, at least one 3d transition metal element.

Q may be one or two or more elements selected from the group consisting of F, Cl, N, and S.

The composition formula (1) may satisfy the following conditions:

$1.05 \leq x \leq 1.4$, $0.6 \leq y \leq 0.95$, $1.33 \leq \alpha \leq 2$, $0 \leq \beta \leq 0.67$.

Such an embodiment can provide a higher-capacity battery.

In the first embodiment, if Me denotes two or more elements (for example, Me' and Me'') with a component ratio of "Me'$_{y1}$Me''$_{y2}$", then "y=y1+y2". For example, if Me denotes two elements (Mn and Co) with a component ratio of "Mn$_{0.6}$Co$_{0.2}$", then "y=0.6+0.2=0.8". If Q denotes two or more elements, the same calculation as in Me can be performed.

In a compound represented by the composition formula (1), x of 1.05 or more results in an increased amount of available Li. This increases the capacity.

In a compound represented by the composition formula (1), x of 1.4 or less results in an increase in the oxidation-reduction reaction of available Me. This obviates the need to increase the utilization of an oxidation-reduction reaction of oxygen. This stabilizes the crystal structure. This increases the capacity.

In a compound represented by the composition formula (1), y of 0.6 or more results in an increase in the oxidation-reduction reaction of available Me. This obviates the need to increase the utilization of an oxidation-reduction reaction of oxygen. This stabilizes the crystal structure. This increases the capacity.

In a compound represented by the composition formula (1), y of 0.95 or less results in an increased amount of available Li. This increases the capacity.

In a compound represented by the composition formula (1), α of 1.33 or more results in the prevention of a decrease in the amount of charge compensation due to oxidation-reduction of oxygen. This increases the capacity.

In a compound represented by the composition formula (1), α of 2 or less results in the prevention of excess capacity due to oxidation-reduction of oxygen and results in stabilization of the structure when Li is deintercalated. This increases the capacity.

In a compound represented by the composition formula (1), β of 0.67 or less results in the prevention of an increase in the effects of electrochemically inactive Q and results in improved electronic conductivity. This increases the capacity.

In a compound represented by the composition formula (1), Me may include one or two or more elements selected from the group consisting of Mn, Co, Ni, Fe, Cu, V, Nb, Ti, Cr, Ru, W, B, Si, P, and Al.

Such an embodiment can provide a higher-capacity battery.

In a compound represented by the composition formula (1), Me may include Mn.

Thus, Me may be Mn.

Alternatively, Me may include Mn and one or two or more elements selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al.

Such an embodiment including Mn, which can easily form a hybrid orbital with oxygen, reduces oxygen desorption during charging. Even with relatively high cation mixing (for example, $0.05 \leq I_{(111)}/I_{(400)} \leq 0.90$ is satisfied), the crystal structure is stabilized. Thus, the battery can have a higher capacity.

In a compound represented by the composition formula (1), Me may include Mn that constitutes 50% or more by mole of Me. In other words, the mole ratio of Mn to the whole Me including Mn (Mn/Me ratio) may range from 0.5 to 1.0.

Such an embodiment including sufficient Mn, which can easily form a hybrid orbital with oxygen, further reduces oxygen desorption during charging. Even with relatively high cation mixing (for example, $0.05 \leq I_{(111)}/I_{(400)} \leq 0.90$ is satisfied), the crystal structure is further stabilized. Thus, the battery can have a higher capacity.

In a compound represented by the composition formula (1), Me may include Mn that constitutes 75% or more by mole of Me. In other words, the mole ratio of Mn to the whole Me including Mn (Mn/Me ratio) may range from 0.75 to 1.0.

Such an embodiment including more Mn, which can easily form a hybrid orbital with oxygen, further reduces oxygen desorption during charging. Even with relatively high cation mixing (for example, $0.05 \leq I_{(111)}/I_{(400)} \leq 0.90$ is satisfied), the crystal structure is further stabilized. Thus, the battery can have a higher capacity.

In a compound represented by the composition formula (1), Me may include one or two or more elements selected from the group consisting of B, Si, P, and Al, which constitute 20% or less by mole of Me.

In such an embodiment, a highly covalent element stabilizes the structure and improves the cycle characteristics. Thus, the battery can have a longer life.

A compound represented by the composition formula (1) may satisfy the following conditions:

$1.1 \leq x \leq 1.2$, $y=0.8$.

Such an embodiment can provide a higher-capacity battery.

A compound represented by the composition formula (1) may satisfy the following conditions:

$1.67 \leq \alpha < 2$, $0 \leq \beta \leq 0.33$.

Such an embodiment can provide a higher-capacity battery.

A compound represented by the composition formula (1) may satisfy the following conditions:

$1.67 \leq \alpha < 2$, $0 < \beta \leq 0.33$.

Such an embodiment can provide a higher-capacity battery.

In other words, a compound represented by the composition formula (1) may contain Q (that is, one or two or more elements selected from the group consisting of F, Cl, N, and S).

Such an embodiment partly substitutes an electrochemically inactive anion for oxygen and thereby stabilizes the crystal structure. The substitution of an anion with a large ionic radius for part of oxygen widens the crystal lattice and improves the diffusibility of Li. Even with relatively high cation mixing (for example, $0.05 \leq I_{(111)}/I_{(400)} \leq 0.90$ is satisfied), the crystal structure is stabilized. Thus, the battery can have a higher capacity.

In a compound represented by the composition formula (1), Q may include F.

Thus, Q may be F.

Alternatively, Q may include F and one or two or more elements selected from the group consisting of Cl, N, and S.

Such an embodiment partly substitutes electronegative F for oxygen and thereby promotes cation-anion interaction and improves the discharge capacity or operating voltage of the battery. Solid solution of electronegative F causes greater electron localization than a lithium composite oxide containing no F. This can reduce oxygen desorption during charging and thereby stabilizes the crystal structure. Even with relatively high cation mixing (for example, $0.05 \leq I_{(111)}/I_{(400)} \leq 0.90$ is satisfied), the crystal structure is stabilized. These effects can work together to provide a higher-capacity battery.

A compound represented by the composition formula (1) may satisfy the following conditions:

$$1.67 \leq \alpha \leq 1.9,$$

$$0.1 \leq \beta \leq 0.33.$$

Such an embodiment can provide a higher-capacity battery.

In a compound represented by the composition formula (1), the ratio of "Li" to "Me" is represented by x/y.

A compound represented by the composition formula (1) may satisfy $1.3 \leq x/y \leq 1.9$.

Such an embodiment can provide a higher-capacity battery.

x/y of more than 1 results in the number of Li atoms at the Li site larger than that in a known positive-electrode active material, for example, represented by the composition formula $LiMnO_2$. This allows more Li to be intercalated and deintercalated.

x/y of 1.3 or more results in an increased amount of available Li and the formation of appropriate Li diffusion paths. Thus, the battery can have a higher capacity.

x/y of 1.9 or less results in the prevention of a decrease in the oxidation-reduction reaction of available Me. This obviates the need to increase the utilization of an oxidation-reduction reaction of oxygen. This can prevent destabilization of the crystal structure when Li is deintercalated during charging and can prevent a decrease in Li intercalation efficiency during discharging. Thus, the battery can have a higher capacity.

A compound represented by the composition formula (1) may satisfy $1.38 \leq x/y \leq 1.5$.

Such an embodiment can provide a higher-capacity battery.

In a compound represented by the composition formula (1), the ratio of "O" to "Q" is represented by $\alpha/\beta$.

A compound represented by the composition formula (1) may satisfy $5 \leq \alpha/\beta \leq 19$.

Such an embodiment can provide a higher-capacity battery.

$\alpha/\beta$ of 5 or more results in the prevention of a decrease in the amount of charge compensation due to oxidation-reduction of oxygen. This can reduce the effects of electrochemically inactive Q and improves electronic conductivity. Thus, the battery can have a higher capacity.

$\alpha/\beta$ of 19 or less results in the prevention of excess capacity due to oxidation-reduction of oxygen and results in stabilization of the structure when Li is deintercalated. Due to the effects of electrochemically inactive Q, this also stabilizes the structure when Li is deintercalated. Thus, the battery can have a higher capacity.

In a compound represented by the composition formula (1), the ratio of "Li+Me" to "O+Q" (that is, the ratio of "cation" to "anion") is represented by $(x+y)/(\alpha+\beta)$.

A compound represented by the composition formula (1) may satisfy $0.75 \leq (x+y)/(\alpha+\beta) \leq 1.2$.

Such an embodiment can provide a higher-capacity battery.

$(x+y)/(\alpha+\beta)$ of 0.75 or more results in the prevention of phase separation to form many impurities during synthesis. Thus, the battery can have a higher capacity.

$(x+y)/(\alpha+\beta)$ of 1.2 or less results in the formation of a structure with less anion deficiency and results in stabilization of the crystal structure when Li is deintercalated during charging. Thus, the battery can have a higher capacity.

A compound represented by the composition formula (1) may satisfy $0.95 \leq (x+y)/(\alpha+\beta) \leq 1.0$.

Such an embodiment can provide a higher-capacity battery with good cycle characteristics.

$(x+y)/(\alpha+\beta)$ of 1.0 or less results in the formation of a cation-deficient structure and the formation of more Li diffusion paths. Thus, the battery can have a higher capacity. Due to randomly arranged cation deficiencies in the initial state, the structure does not become unstable when Li is deintercalated. Thus, the battery can have good cycle characteristics and a long life.

In the lithium composite oxide according to the first embodiment, Li may partly be substituted with an alkali metal, such as Na or K.

The positive-electrode active material according to the first embodiment may contain the lithium composite oxide as a main component (that is, the mass ratio of the lithium composite oxide to the positive-electrode active material is 50% or more (50% or more by mass)).

Such an embodiment can provide a higher-capacity battery.

The mass ratio of the lithium composite oxide to the positive-electrode active material according to the first embodiment may be 70% or more (70% or more by mass).

Such an embodiment can provide a higher-capacity battery.

The mass ratio of the lithium composite oxide to the positive-electrode active material according to the first embodiment may be 90% or more (90% or more by mass).

Such an embodiment can provide a higher-capacity battery.

The positive-electrode active material according to the first embodiment may contain incidental impurities in addition to the lithium composite oxide.

The positive-electrode active material according to the first embodiment may contain at least one selected from the group consisting of the starting materials for the synthesis of the positive-electrode active material, by-products, and degradation products, in addition to the lithium composite oxide.

The positive-electrode active material according to the first embodiment may contain the lithium composite oxide alone except for incidental impurities, for example.

Such an embodiment can provide a higher-capacity battery.

<Method for Producing Compound>

A method for producing a lithium composite oxide contained in the positive-electrode active material according to the first embodiment is described below.

The lithium composite oxide according to the first embodiment can be produced by the following method, for example.

A raw material containing Li, a raw material containing Me, and a raw material containing Q are prepared.

Examples of the raw material containing Li include oxides, such as $Li_2O$ and $Li_2O_2$, salts, such as LiF, $Li_2CO_3$, and LiOH, and lithium composite oxides, such as $LiMeO_2$ and $LiMe_2O_4$.

Examples of the raw material containing Me include various oxides, such as $Me_2O_3$, salts, such as $MeCO_3$ and $MeNO_3$, hydroxides, such as $Me(OH)_2$ and MeOOH, and lithium composite oxides, such as $LiMeO_2$ and $LiMe_2O_4$.

In the case that Me is Mn, examples of the raw material containing Mn include various manganese oxides, such as $MnO_2$ and $Mn_2O_3$, salts, such as $MnCO_3$ and $MnNO_3$, hydroxides, such as $Mn(OH)_2$ and MnOOH, and lithium composite oxides, such as $LiMnO_2$ and $LiMn_2O_4$.

Examples of the raw material containing Q include lithium halides, transition metal halides, transition metal sulfides, and transition metal nitrides.

For example, if Q is F, examples of the raw material containing F include LiF and transition metal fluorides.

These raw materials are weighed at the mole ratio of the composition formula (1), for example.

The variables "x, y, α, and β" in the composition formula (1) can be altered in the ranges described for the composition formula (1).

The weighed raw materials are mixed, for example, by a dry process or a wet process and are allowed to react mechanochemically for 10 hours or more to produce a compound (precursor). For example, a mixing apparatus, such as a planetary ball mill, may be used.

Subsequently, the resulting compound is heat-treated. This produces the lithium composite oxide according to the first embodiment with a structure in which atoms are partly regularly arranged.

The conditions for the heat treatment are appropriately determined to produce the lithium composite oxide according to the first embodiment. Although the optimum heat treatment conditions depend on other production conditions and the target composition, the present inventors found that the amount of cation mixing tends to decrease with the heat treatment temperature and the heat treatment time. Thus, the manufacturer can determine the heat treatment conditions on the basis of this tendency. The heat treatment temperature and time may range from 400° C. to 600° C. and 30 minutes to 2 hours, for example. The heat treatment atmosphere may be an air atmosphere, an oxygen atmosphere, or an inert atmosphere, such as nitrogen or argon.

Thus, the raw materials to be used and the mixing conditions and the heat-treatment conditions of a raw material mixture can be adjusted to substantially produce the lithium composite oxide according to the first embodiment.

For example, the use of a lithium transition metal composite oxide as a precursor can decrease the energy for mixing elements. This can improve the purity of the lithium composite oxide according to the first embodiment.

The composition of the lithium composite oxide can be determined, for example, by ICP spectroscopy, an inert gas fusion-infrared absorption method, ion chromatography, or a combination thereof.

The space group of the crystal structure of the lithium composite oxide can be determined by powder X-ray analysis.

Thus, a method for producing the positive-electrode active material according to the first embodiment includes the steps of (a) preparing the raw materials, (b) mechanochemically reacting the raw materials to produce a precursor of the positive-electrode active material, and (c) heat-treating the precursor to produce the positive-electrode active material.

The step (a) may include a step of mixing the raw materials at a Li/Me mole ratio in the range of 1.3 to 1.9 to prepare a raw material mixture.

The step (a) may include a step of producing a lithium compound as a raw material by a known method.

The step (a) may include a step of mixing the raw materials at a Li/Me mole ratio in the range of 1.38 to 1.5 to prepare a raw material mixture.

The step (b) may include a step of mechanochemically reacting the raw materials in a ball mill.

Thus, the lithium composite oxide according to the first embodiment can be synthesized by mechanochemically reacting the precursor (for example, LiF, $Li_2O$, an oxidized transition metal, a lithium composite transition metal, etc.) in a planetary ball mill.

Second Embodiment

A second embodiment is described below. The contents described in the first embodiment are appropriately omitted to avoid overlap.

A battery according to the second embodiment includes a positive electrode containing the positive-electrode active material according to the first embodiment, a negative electrode, and an electrolyte.

Such an embodiment can provide a high-capacity battery.

In the battery according to the second embodiment, the positive electrode may have a positive-electrode active material layer. The positive-electrode active material layer may contain the positive-electrode active material according to the first embodiment as a main component (that is, the mass ratio of the positive-electrode active material to the positive-electrode active material layer is 50% or more (50% or more by mass)).

Such an embodiment can provide a higher-capacity battery.

Alternatively, the positive-electrode active material layer in the battery according to the second embodiment may contain the positive-electrode active material according to the first embodiment constituting 70% or more of the positive-electrode active material layer on a mass basis (70% or more by mass).

Such an embodiment can provide a higher-capacity battery.

Alternatively, the positive-electrode active material layer in the battery according to the second embodiment may contain the positive-electrode active material according to the first embodiment constituting 90% or more of the positive-electrode active material layer on a mass basis (90% or more by mass).

Such an embodiment can provide a higher-capacity battery.

The battery according to the second embodiment may be a lithium-ion secondary battery, a non-aqueous electrolyte secondary battery, or an all-solid-state battery, for example.

In the battery according to the second embodiment, the negative electrode may contain a negative-electrode active material that can adsorb and desorb lithium ions, for example. The negative electrode may contain a material that can dissolve and precipitate lithium metal as a negative-electrode active material, for example.

In the battery according to the second embodiment, for example, the electrolyte may be a non-aqueous electrolyte (for example, a non-aqueous electrolyte solution).

In the battery according to the second embodiment, the electrolyte may be a solid electrolyte, for example.

FIG. 1 is a schematic cross-sectional view of a battery 10, which is an example of the battery according to the second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with a non-aqueous electrolyte (for example, a non-aqueous electrolyte solution), for example.

The positive electrode 21, the negative electrode 22, and the separator 14 constitute an electrode assembly.

The electrode assembly is housed in the case 11.

The case 11 is sealed with the gasket 18 and the sealing plate 15.

The positive electrode 21 includes a positive-electrode current collector 12 and a positive-electrode active material layer 13 disposed on the positive-electrode current collector 12.

The positive-electrode current collector 12 is formed of a metallic material (aluminum, stainless steel, an aluminum alloy, etc.), for example.

The positive-electrode current collector 12 may be omitted, and the case 11 may be used as a positive-electrode current collector.

The positive-electrode active material layer 13 contains the positive-electrode active material according to the first embodiment.

If necessary, the positive-electrode active material layer 13 may contain an additive agent (an electrically conductive agent, an ionic conduction aid, a binder, etc.).

The negative electrode 22 includes a negative-electrode current collector 16 and a negative-electrode active material layer 17 disposed on the negative-electrode current collector 16.

The negative-electrode current collector 16 is formed of a metallic material (aluminum, stainless steel, an aluminum alloy, etc.), for example.

The negative-electrode current collector 16 may be omitted, and the sealing plate 15 may be used as a negative-electrode current collector.

The negative-electrode active material layer 17 contains a negative-electrode active material.

If necessary, the negative-electrode active material layer 17 may contain an additive agent (an electrically conductive agent, an ionic conduction aid, a binder, etc.).

The negative-electrode active material may be a metallic material, carbon material, oxide, nitride, tin compound, or silicon compound.

The metallic material may be a single metal. Alternatively, the metallic material may be an alloy. Examples of the metallic material include lithium metal and lithium alloys.

Examples of the carbon material include natural graphite, coke, carbon under graphitization, carbon fiber, spherical carbon, artificial graphite, and amorphous carbon.

From the perspective of capacity density, the negative-electrode active material may be silicon (Si), tin (Sn), a silicon compound, or a tin compound. The silicon compound and the tin compound may be an alloy or a solid solution.

Examples of the silicon compound include $SiO_x$ (wherein $0.05<x<1.95$). A compound (an alloy or a solid solution) produced by substituting part of silicon of $SiO_x$ with another element may also be used. The other element may be at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (wherein $0<x<2$), $SnO_2$, and $SnSiO_3$. A tin compound selected from these compounds may be used alone. Alternatively, two or more tin compounds selected from these compounds may be used in combination.

The negative-electrode active material may have any shape. The negative-electrode active material may have a known shape (particulate, fibrous, etc.).

The negative-electrode active material layer 17 may be filled with (adsorb) lithium by any method. More specifically, the method may be (a) a method of depositing lithium on the negative-electrode active material layer 17 by a gas phase method, such as a vacuum evaporation method, or (b) a method of heating a lithium metal foil in contact with the negative-electrode active material layer 17. In these methods, lithium can be diffused into the negative-electrode active material layer 17 by heat. Alternatively, lithium may be electrochemically adsorbed on the negative-electrode active material layer 17. More specifically, a battery is fabricated from the negative electrode 22 free of lithium and a lithium metal foil (positive electrode). Subsequently, the battery is charged to adsorb lithium on the negative electrode 22.

Examples of the binder for the positive electrode 21 and the negative electrode 22 include poly(vinylidene difluoride), polytetrafluoroethylene, polyethylene, polypropylene, aramid resin, polyimide, polyimide, polyamideimide, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene-butadiene rubber, and carboxymethylcellulose. Other examples of the binder include copolymers of two or more materials selected from the group consisting of tetrafluoroethylene, hexafluoroethane, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. The binder may also be a mixture of two or more materials selected from these materials.

Examples of the electrically conductive agent for the positive electrode 21 and the negative electrode 22 include graphite, carbon black, electrically conductive fiber, graphite fluoride, metal powders, electrically conductive whiskers, electrically conductive metal oxides, and electrically conductive organic materials. Examples of the graphite include natural graphite and artificial graphite. Examples of the carbon black include acetylene black, ketjen black (registered trademark), channel black, furnace black, lampblack, and thermal black. Examples of the metal powders include aluminum powders. Examples of the electrically conductive whiskers include zinc oxide whiskers and potassium titanate whiskers. Examples of the electrically conductive metal oxides include titanium oxide. Examples of the electrically conductive organic materials include phenylene derivatives.

A material that can be used as the electrically conductive agent may be used to cover at least part of the surface of the binder. For example, the binder may be covered with carbon black. This can improve the capacity of the battery.

The separator 14 may be formed of a material that has high ion permeability and sufficient mechanical strength. Examples of such a material include microporous thin films, woven fabrics, and nonwoven fabrics. More specifically, it is desirable that the separator 14 be formed of a polyolefin, such as polypropylene or polyethylene. The separator 14 formed of a polyolefin has not only good durability but also a shutdown function in case of excessive heating. The separator 14 has a thickness in the range of 10 to 300 µm (or 10 to 40 µm), for example. The separator 14 may be a monolayer film formed of one material. Alternatively, the separator 14 may be a composite film (or multilayer film) formed of two or more materials. The separator 14 has a porosity in the range of 30% to 70% (or 35% to 60%), for example. The term "porosity", as used herein, refers to the volume ratio of pores to the separator 14. The "porosity" is measured by a mercury intrusion method, for example.

The non-aqueous electrolyte solution contains a non-aqueous solvent and a lithium salt dissolved in the non-aqueous solvent.

Examples of the non-aqueous solvent include cyclic carbonate solvents, chain carbonate solvents, cyclic ether solvents, chain ether solvents, cyclic ester solvents, chain ester solvents, and fluorinated solvents.

Examples of the cyclic carbonate solvents include ethylene carbonate, propylene carbonate, and butylene carbonate.

Examples of the chain carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the chain ether solvents include 1,2-dimethoxyethane and 1,2-diethoxyethane.

Examples of the cyclic ester solvents include γ-butyrolactone.

Examples of the chain ester solvents include methyl acetate.

Examples of the fluorinated solvents include fluoroethylene carbonate, methyl fluoropropionate, fluorobenzene, fluoroethyl methyl carbonate, and fluorodimethylene carbonate.

The non-aqueous solvent may be one non-aqueous solvent selected from these used alone. Alternatively, the non-aqueous solvent may be a combination of two or more non-aqueous solvents selected from these.

The non-aqueous electrolyte solution may contain at least one fluorinated solvent selected from the group consisting of fluoroethylene carbonate, methyl fluoropropionate, fluorobenzene, fluoroethyl methyl carbonate, and fluorodimethylene carbonate.

These fluorinated solvents in the non-aqueous electrolyte solution improve the oxidation resistance of the non-aqueous electrolyte solution.

Consequently, even when the battery 10 is charged at a high voltage, the battery 10 can operate stably.

In the battery according to the second embodiment, the electrolyte may be a solid electrolyte.

Examples of the solid electrolyte include organic polymer solid electrolytes, oxide solid electrolytes, and sulfide solid electrolytes.

Examples of the organic polymer solid electrolytes include compounds of a polymer and a lithium salt.

The polymer may have an ethylene oxide structure. The ethylene oxide structure can increase the lithium salt content and ionic conductivity.

Examples of the oxide solid electrolytes include NASICON-type solid electrolytes, exemplified by $LiTi_2(PO_4)_3$ and element substitution products thereof, $(LaLi)TiO_3$ perovskite solid electrolytes, LISICON-type solid electrolytes, exemplified by $Li_{14}ZnGe_4O_{16}$, $Li_4SiO_4$, $LiGeO_4$, and element substitution products thereof, garnet solid electrolytes, exemplified by $Li_7La_3Zr_2O_{12}$ and element substitution products thereof, $Li_3N$ and H substitution products thereof, and $Li_3PO_4$ and N substitution products thereof.

Examples of the sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. LiX (X: F, Cl, Br, I), $MO_y$, or $Li_xMO_y$ (M: P, Si, Ge, B, Al, Ga, or In) (x, y: natural number) may be added to the sulfide solid electrolytes.

Among these, in particular, sulfide solid electrolytes have high formability and ionic conductivity. Thus, a sulfide solid electrolyte can be used as a solid electrolyte to produce a battery with a higher energy density.

Among sulfide solid electrolytes, $Li_2S$—$P_2S_5$ has high electrochemical stability and higher ionic conductivity. Thus, $Li_2S$—$P_2S_5$ can be used as a solid electrolyte to produce a battery with a higher energy density.

A solid electrolyte layer may contain the non-aqueous electrolyte solution.

A non-aqueous electrolyte solution in a solid electrolyte layer facilitates lithium ion transfer between an active material and the solid electrolyte. Consequently, the battery can have a higher energy density.

In addition to a solid electrolyte, a solid electrolyte layer may contain a gel electrolyte or an ionic liquid.

The gel electrolyte may be a polymer material containing a non-aqueous electrolyte solution. The polymer material may be poly(ethylene oxide), polyacrylonitrile, poly(vinylidene difluoride), poly(methyl methacrylate), or a polymer having an ethylene oxide bond.

A cation in the ionic liquid may be an aliphatic chain quaternary salt, such as tetraalkylammonium or tetraalkylphosphonium, an alicyclic ammonium, such as pyrrolidinium, morpholinium, imidazolinium, tetrahydropyrimidinium, piperazinium, or piperidinium, or a nitrogen-containing heterocyclic aromatic cation, such as pyridinium or imidazolium. An anion in the ionic liquid may be $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may contain a lithium salt.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The lithium salt may be one lithium salt selected from these used alone. Alternatively, the lithium salt may be a mixture of two or more lithium salts selected from these. The concentration of the lithium salt ranges from 0.5 to 2 mol/l, for example.

The battery according to the second embodiment may be of various types, such as a coin type, a cylindrical type, a square or rectangular type, a sheet type, a button type, a flat type, or a layered type.

EXAMPLES

Example 1

[Production of Positive-Electrode Active Material]

LiF, $Li_2MnO_3$, and $LiMnO_2$ were weighed at a mole ratio of Li/Mn/O/F=1.2/0.8/1.67/0.33.

The raw materials, together with a proper amount of φ3-mm zirconia balls, were put in a 45-cc zirconia container, which was then sealed in an argon glove box.

The raw materials were removed from the argon glove box and were treated in a planetary ball mill at 600 rpm for 30 hours to prepare a precursor.

The precursor was subjected to X-ray powder diffractometry.

The space group of the precursor was Fm-3m.

The precursor was then heat-treated at 500° C. for 1 hour in an air atmosphere.

The resulting positive-electrode active material was subjected to X-ray powder diffractometry.

Figure 2:
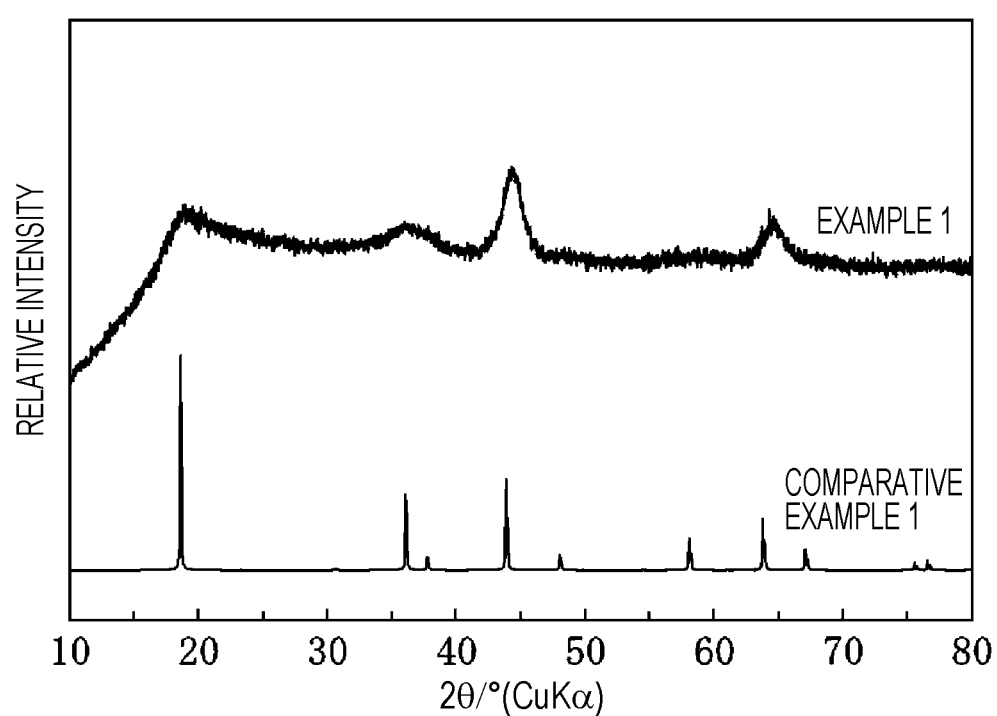
FIG. 2 shows X-ray powder diffraction charts of positive-electrode active materials according to Example 1 and Comparative Example 1.

FIG. 2 shows the results.

The space group of the positive-electrode active material was Fd-3m.

The integrated intensity ratio $I_{(111)}/I_{(400)}$ of a peak on the (111) plane to a peak on the (400) plane in the positive-electrode active material was 0.23.

[Fabrication of Battery]

70 parts by mass of the positive-electrode active material, 20 parts by mass of an electrically conductive agent, 10 parts by mass of poly(vinylidene difluoride) (PVDF), and a proper amount of 2-methylpyrrolidone (NMP) were mixed to prepare a positive-electrode mixture slurry.

The positive-electrode mixture slurry was applied to one side of a positive-electrode current collector formed of aluminum foil 20 μm in thickness.

The positive-electrode mixture slurry was dried and rolled to form a positive-electrode sheet with a positive-electrode active material layer. The positive-electrode sheet had a thickness of 60 μm.

A circular positive electrode 12.5 mm in diameter was punched out from the positive-electrode sheet.

A circular negative electrode 14.0 mm in diameter was punched out from lithium metal foil 300 μm in thickness.

Fluoroethylene carbonate (FEC), ethylene carbonate (EC), and ethyl methyl carbonate (EMC) were mixed at a volume ratio of 1:1:6 to prepare a non-aqueous solvent.

$LiPF_6$ was dissolved at a concentration of 1.0 mol/l in the non-aqueous solvent to prepare a non-aqueous electrolyte solution.

A separator (manufactured by Celgard, LLC., product number 2320, 25 μm in thickness) was impregnated with the non-aqueous electrolyte solution. This separator is a 3-layer separator composed of a polypropylene layer, a polyethylene layer, and a polypropylene layer.

A CR2032 coin-type battery was fabricated from the positive electrode, the negative electrode, and the separator in a dry box maintained at a dew point of −50° C.

Examples 2 to 19

The raw materials and the Li/Me/O/F mixing ratio were changed from those described in Example 1.

The heat treatment conditions were changed in the range of 400° C. to 600° C. and in the range of 30 minutes to 2 hours from those described in Example 1.

Except for these, the positive-electrode active materials according to Examples 2 to 19 were synthesized in the same manner as in Example 1.

Table 1 lists the compositions of the positive-electrode active materials according to Examples 2 to 19.

The space group of the positive-electrode active materials according to Examples 2 to 19 was Fd-3m.

The raw materials in Examples 2 to 19 were weighed at the stoichiometric ratio and were mixed in the same manner as in Example 1.

For example, in Example 4, LiF, $Li_2MnO_3$, $LiMnO_2$, $LiCoO_2$, and $LiNiO_2$ were weighed and mixed at a mole ratio of Li/Mn/Co/Ni/O/F=1.2/0.6/0.1/0.1/1.67/0.33.

The positive-electrode active materials according to Examples 2 to 19 were used to fabricate coin-type batteries according to Examples 2 to 19 in the same manner as in Example 1.

Example 20

A positive-electrode active material with a composition represented by $Li_{1.2}Mn_{0.8}O_2$ was produced in the same manner as in Example 1.

LiF was not used as a raw material.

The space group of the positive-electrode active material was Fd-3m.

The integrated intensity ratio $I_{(111)}/I_{(400)}$ of a peak on the (111) plane to a peak on the (400) plane in the positive-electrode active material was 0.15.

The positive-electrode active material was used to fabricate a coin-type battery in the same manner as in Example 1.

Comparative Example 1

A positive-electrode active material with a composition represented by $LiMn_2O_4$ (lithium manganese oxide) was produced by a known technique.

The resulting positive-electrode active material was subjected to X-ray powder diffractometry.

FIG. 2 shows the results.

The space group of the positive-electrode active material was Fd-3m.

The integrated intensity ratio $I_{(111)}/I_{(400)}$ of a peak on the (111) plane to a peak on the (400) plane in the positive-electrode active material was 1.30.

The positive-electrode active material was used to fabricate a coin-type battery in the same manner as in Example 1.

Comparative Example 2

A positive-electrode active material with a composition represented by $Li_{1.2}Mn_{0.8}O_{1.67}F_{0.33}$ was produced in the same manner as in Example 1.

The heat treatment conditions were changed to 500° C. for 5 hours.

The space group of the positive-electrode active material was Fd-3m.

The integrated intensity ratio $I_{(111)}/I_{(400)}$ of a peak on the (111) plane to a peak on the (400) plane in the positive-electrode active material was 1.04.

The positive-electrode active material was used to fabricate a coin-type battery in the same manner as in Example 1.

Comparative Example 3

A positive-electrode active material with a composition represented by $Li_{1.2}Mn_{0.8}O_{1.67}F_{0.33}$ was produced in the same manner as in Example 1.

The heat treatment conditions were changed to 500° C. for 10 minutes.

Subsequently, the discharge cut-off voltage was set at 2.5 V, and the battery according to Comparative Example 1 was discharged at a current density of 0.5 mA/cm².

The battery according to Comparative Example 1 had an initial discharge capacity of 140 mAh/g.

The initial discharge capacities of the coin-type batteries according to Examples 2 to 20 and Comparative Examples 2 and 3 were measured.

Table 1 shows the results.

TABLE 1

| | Average composition | x/y | α/β | (x + y)/(α + β) | Space group | $I_{(111)}/I_{(400)}$ | Initial discharge capacity (mAh/g) |
|---|---|---|---|---|---|---|---|
| Example 1 | $Li_{1.2}Mn_{0.8}O_{1.67}F_{0.33}$ | 1.5 | 5 | 1.0 | Fd-3m | 0.23 | 300 |
| Example 2 | $Li_{1.2}Mn_{0.8}O_{1.67}F_{0.33}$ | 1.5 | 5 | 1.0 | Fd-3m | 0.05 | 284 |
| Example 3 | $Li_{1.2}Mn_{0.8}O_{1.67}F_{0.33}$ | 1.5 | 5 | 1.0 | Fd-3m | 0.70 | 272 |
| Example 4 | $Li_{1.2}Mn_{0.6}Co_{0.1}Ni_{0.1}O_{1.67}F_{0.33}$ | 1.5 | 5 | 1.0 | Fd-3m | 0.30 | 287 |
| Example 5 | $Li_{1.2}Mn_{0.4}Co_{0.2}Ni_{0.2}O_{1.67}F_{0.33}$ | 1.5 | 5 | 1.0 | Fd-3m | 0.25 | 275 |
| Example 6 | $Li_{1.2}Mn_{0.8}O_{1.9}F_{0.1}$ | 1.5 | 19 | 1.0 | Fd-3m | 0.25 | 292 |
| Example 7 | $Li_{1.1}Mn_{0.8}O_{1.67}F_{0.33}$ | 1.38 | 5 | 0.95 | Fd-3m | 0.29 | 297 |
| Example 8 | $Li_{1.2}Mn_{0.75}B_{0.05}O_{1.67}F_{0.33}$ | 1.5 | 5 | 1.0 | Fd-3m | 0.28 | 285 |
| Example 9 | $Li_{1.2}Mn_{0.75}P_{0.05}O_{1.67}F_{0.33}$ | 1.5 | 5 | 1.0 | Fd-3m | 0.24 | 289 |
| Example 10 | $Li_{1.2}Mn_{0.75}Al_{0.05}O_{1.67}F_{0.33}$ | 1.5 | 5 | 1.0 | Fd-3m | 0.23 | 282 |
| Example 11 | $Li_{1.2}Mn_{0.75}Ti_{0.05}O_{1.67}F_{0.33}$ | 1.5 | 5 | 1.0 | Fd-3m | 0.23 | 280 |
| Example 12 | $Li_{1.2}Mn_{0.75}Nb_{0.05}O_{1.67}F_{0.33}$ | 1.5 | 5 | 1.0 | Fd-3m | 0.19 | 277 |
| Example 13 | $Li_{1.2}Mn_{0.75}W_{0.05}O_{1.67}F_{0.33}$ | 1.5 | 5 | 1.0 | Fd-3m | 0.20 | 276 |
| Example 14 | $Li_{1.2}Mn_{0.75}V_{0.05}O_{1.67}F_{0.33}$ | 1.5 | 5 | 1.0 | Fd-3m | 0.22 | 281 |
| Example 15 | $Li_{1.2}Mn_{0.75}Cr_{0.05}O_{1.67}F_{0.33}$ | 1.5 | 5 | 1.0 | Fd-3m | 0.22 | 283 |
| Example 16 | $Li_{1.2}Mn_{0.75}Si_{0.05}O_{1.67}F_{0.33}$ | 1.5 | 5 | 1.0 | Fd-3m | 0.24 | 275 |
| Example 17 | $Li_{1.2}Mn_{0.75}Fe_{0.05}O_{1.67}F_{0.33}$ | 1.5 | 5 | 1.0 | Fd-3m | 0.19 | 276 |
| Example 18 | $Li_{1.2}Mn_{0.75}Cu_{0.05}O_{1.67}F_{0.33}$ | 1.5 | 5 | 1.0 | Fd-3m | 0.22 | 274 |
| Example 19 | $Li_{1.2}Mn_{0.75}Ru_{0.05}O_{1.67}F_{0.33}$ | 1.5 | 5 | 1.0 | Fd-3m | 0.21 | 278 |
| Example 20 | $Li_{1.2}Mn_{0.8}O_2$ | 1.5 | — | 1.0 | Fd-3m | 0.15 | 267 |
| Comparative example 1 | $LiMn_2O_4$ | 0.5 | — | 0.75 | Fd-3m | 1.30 | 140 |
| Comparative example 2 | $Li_{1.2}Mn_{0.8}O_{1.67}F_{0.33}$ | 1.5 | 5 | 1.0 | Fd-3m | 1.04 | 238 |
| Comparative example 3 | $Li_{1.2}Mn_{0.8}O_{1.67}F_{0.33}$ | 1.5 | 5 | 1.0 | Fd-3m | 0.02 | 251 |

The space group of the positive-electrode active material was Fd-3m.

The integrated intensity ratio $I_{(111)}/I_{(400)}$ of a peak on the (111) plane to a peak on the (400) plane in the positive-electrode active material was 0.02.

The positive-electrode active material was used to fabricate a coin-type battery in the same manner as in Example 1.

<Evaluation of Battery>

The current density in the positive electrode was set at 0.5 mA/cm², and the battery according to Example 1 was charged to a voltage of 4.9 V.

Subsequently, the discharge cut-off voltage was set at 2.5 V, and the battery according to Example 1 was discharged at a current density of 0.5 mA/cm².

The battery according to Example 1 had an initial discharge capacity of 300 mAh/g.

The current density in the positive electrode was set at 0.5 mA/cm², and the battery according to Comparative Example 1 was charged to a voltage of 4.3 V.

Table 1 shows that the batteries according to Examples 1 to 20 have an initial discharge capacity in the range of 267 to 300 mAh/g.

Thus, the batteries according to Examples 1 to 20 have a larger initial discharge capacity than the batteries according to Comparative Examples 1 to 3.

This is probably because in the batteries according to Examples 1 to 20 the lithium composite oxide in the positive-electrode active material has a crystal structure belonging to the space group Fd-3m, and the integrated intensity ratio $I_{(111)}/I_{(400)}$ of a peak on the (111) plane to a peak on the (400) plane in the XRD pattern satisfies $0.05 \leq I_{(111)}/I_{(400)} \leq 0.90$. More specifically, cation mixing between Li and Me increased the amount of adjacent Li and improved the diffusibility of Li. This increased the number of three-dimensional diffusion paths of lithium and allowed more Li to be intercalated and deintercalated. This greatly improved the initial discharge capacity.

In Comparative Example 1, $I_{(111)}/I_{(400)}$ is more than 0.90 ($I_{(111)}/I_{(400)}=1.30$). This suppressed cation mixing and decreased the number of three-dimensional diffusion paths of lithium. Furthermore, x/y is low (x/y=0.5). This resulted in a decreased amount of Li involved in the reaction and a decrease in the diffusibility of Li ions. This greatly reduced the initial discharge capacity.

In Comparative Example 2, $I_{(111)}/I_{(400)}$ is more than 0.90 ($I_{(111)}/I_{(400)}=1.04$). This suppressed cation mixing and decreased the number of three-dimensional diffusion paths of lithium. This reduced the initial discharge capacity.

In Comparative Example 3, $I_{(111)}/I_{(400)}$ is less than 0.05 ($I_{(111)}/I_{(400)}=0.02$). This thermodynamically destabilized the crystal structure, and the crystal structure collapsed when Li was deintercalated during charging. This reduced the initial discharge capacity.

Table 1 also shows that the battery according to Example 2 has a smaller initial discharge capacity than the battery according to Example 1.

This is probably because Example 2 has a lower $I_{(111)}/I_{(400)}$ ($I_{(111)}/I_{(400)}=0.05$) than Example 1. This destabilized the crystal structure and reduced the initial discharge capacity.

Table 1 also shows that the battery according to Example 3 has a smaller initial discharge capacity than the battery according to Example 1.

This is probably because Example 3 has a higher $I_{(111)}/I_{(400)}$ ($I_{(111)}/I_{(400)}=0.70$) than Example 1. This suppressed cation mixing and slightly decreased the number of three-dimensional diffusion paths of lithium. This reduced the initial discharge capacity.

Table 1 also shows that the battery according to Example 4 has a smaller initial discharge capacity than the battery according to Example 1.

This is probably because the amount of Mn, which can easily form a hybrid orbital with oxygen, was smaller in Example 4 than in Example 1. In other words, Co and Ni have weaker orbital hybridization with oxygen than Mn. Thus, oxygen was desorbed during charging, and the crystal structure became unstable. Furthermore, the contribution of an oxidation-reduction reaction of oxygen was reduced. This reduced the initial discharge capacity.

Table 1 also shows that the battery according to Example 5 has a smaller initial discharge capacity than the battery according to Example 4.

This is probably because the amount of Mn, which can easily form a hybrid orbital with oxygen, was smaller in Example 5 than in Example 4. Thus, oxygen was desorbed during charging, and the crystal structure became unstable. Furthermore, the contribution of an oxidation-reduction reaction of oxygen was reduced. This reduced the initial discharge capacity.

Table 1 also shows that the battery according to Example 6 has a smaller initial discharge capacity than the battery according to Example 1.

This is probably because Example 6 has a higher $\alpha/\beta$ ($\alpha/\beta=19$) than Example 1. Thus, the capacity due to oxidation-reduction of oxygen becomes excessive. Furthermore, the effects of electronegative F decreased, and the structure became unstable when Li was deintercalated. This reduced the initial discharge capacity.

Table 1 also shows that the battery according to Example 7 has a smaller initial discharge capacity than the battery according to Example 1.

This is probably because Example 7 has a lower x/y ($x/y=1.38$) than Example 1. This increased isolated Li in the crystal structure and decreased the amount of Li involved in the reaction. This reduced the diffusibility of Li ions and decreased the initial discharge capacity. However, isolated Li functioned as a pillar and improved cycle characteristics.

Table 1 also shows that the batteries according to Examples 8 to 19 have a smaller initial discharge capacity than the battery according to Example 1.

This is probably because the amount of Mn, which can easily form a hybrid orbital with oxygen, was smaller in Examples 8 to 19 than in Example 1. This reduced the contribution of an oxidation-reduction reaction of oxygen and decreased the initial discharge capacity.

Table 1 also shows that the battery according to Example 20 has a smaller initial discharge capacity than the battery according to Example 1.

This is probably because the lithium composite oxide in Example 20 contains no F. Thus, electronegative F was not substituted for part of oxygen, and the cation-anion interaction decreased. Thus, oxygen desorption during charging made the crystal structure unstable. This reduced the initial discharge capacity.

What is claimed is:

1. A positive-electrode active material comprising
a lithium composite oxide represented by a formula $Li_xMe_yO_\alpha Q_\beta$, where Me is Mn or Me is Mn and at least one selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al; Q is at least one selected from the group consisting of F, Cl, N, and S; $1.05 \le x \le 1.4$; $0.6 \le y \le 0.95$; $x+y=2$; $1.33 \le \alpha \le 2$; and $0 \le \beta \le 0.67$,
wherein a crystal structure of the lithium composite oxide belongs to a space group Fd-3m, and
an integrated intensity ratio $I_{(111)}/I_{(400)}$ of a first peak $I_{(111)}$ on a (111) plane to a second peak $I_{(400)}$ on a (400) plane in an X-ray diffraction (XRD) pattern of the lithium composite oxide satisfies $0.05 \le I_{(111)}/I_{(400)} \le 0.90$.

2. The positive-electrode active material according to claim 1, wherein
$0.05 \le I_{(111)}/I_{(400)} \le 0.70$.

3. The positive-electrode active material according to claim 2, wherein
$0.05 \le I_{(111)}/I_{(400)} \le 0.30$.

4. The positive-electrode active material according to claim 1, wherein Me is Mn.

5. The positive-electrode active material according to claim 1, wherein
Me is Mn and at least one selected from the group consisting of Co, Ni, Fe, Cu, V, Nb, Ti, Cr, Ru, W, B, Si, P, and Al.

6. The positive-electrode active material according to claim 1, wherein
Mn constitutes 50 mol % or more of Me.

7. The positive-electrode active material according to claim 1, wherein
Q includes F.

8. The positive-electrode active material according to claim 7, wherein
Q is F.

9. The positive-electrode active material according to claim 1, wherein
$1.1 \le x \le 1.2$, and
$y=0.8$.

10. The positive-electrode active material according to claim 1, wherein
$1.67 \le \alpha \le 2$, and
$0 - \beta \le 0.33$.

11. The positive-electrode active material according to claim 10, wherein
$1.67 \le \alpha < 2$, and
$0 < \beta \le 0.33$.

12. The positive-electrode active material according to claim 10, wherein
$1.67 \leq \alpha \leq 1.9$, and
$0.1 \leq \beta \leq 0.33$.

13. The positive-electrode active material according to claim 1, wherein
$1.3 \leq x/y \leq 1.9$.

14. The positive-electrode active material according to claim 13, wherein
$1.38 \leq x/y \leq 1.5$.

15. The positive-electrode active material according to claim 1, wherein
$5 \leq \alpha/\beta \leq 19$.

16. The positive-electrode active material according to claim 1, wherein
$0.75 \leq (x+y)/(\alpha+\beta) \leq 1.2$.

17. The positive-electrode active material according to claim 16, wherein
$0.95 \leq (x+y)/(\alpha+\beta) \leq 1.0$.

18. A battery comprising:
a positive electrode including the positive-electrode active material according to claim 1;
a negative electrode; and
an electrolyte.

19. The battery according to claim 18, wherein
the negative electrode includes a negative-electrode active material which lithium ions are occluded in and released from, or a material which lithium metal is dissolved from and deposited on, and
the electrolyte is a non-aqueous electrolyte solution.

20. The battery according to claim 18, wherein
the negative electrode includes a negative-electrode active material which lithium ions are occluded in and released from, or a material which lithium metal is dissolved from and deposited on, and
the electrolyte is a solid electrolyte.

* * * * *